Feb. 12, 1957     J. M. MILLER     2,780,960
MAGNIFYING MIRROR FOR MEDICINE CABINET
Filed Sept. 2, 1954     2 Sheets-Sheet 1
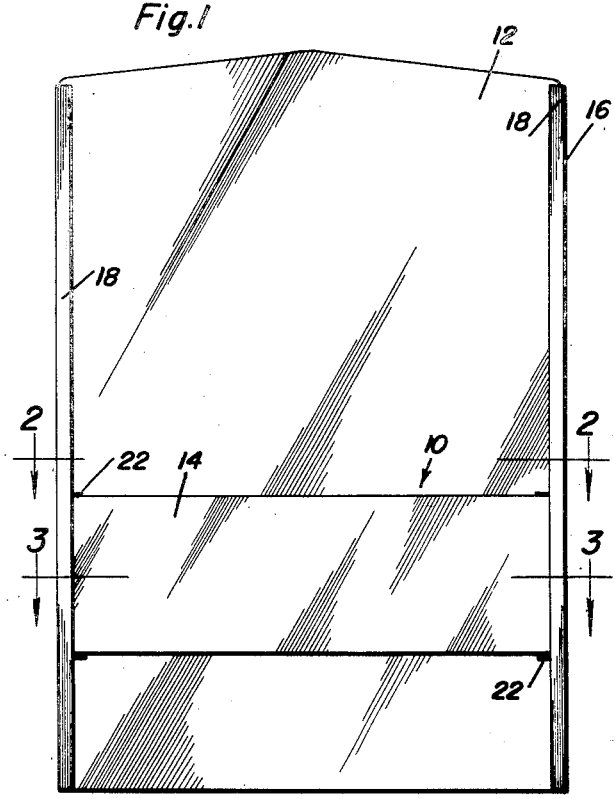
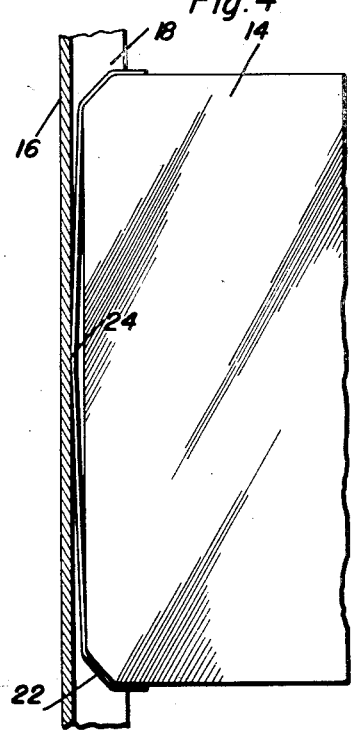
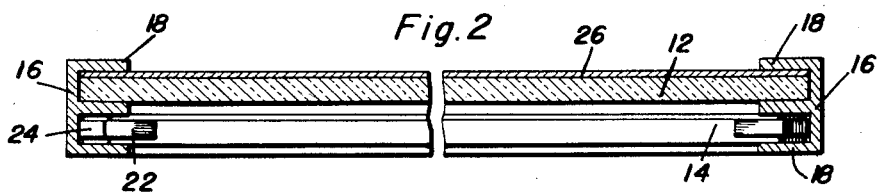
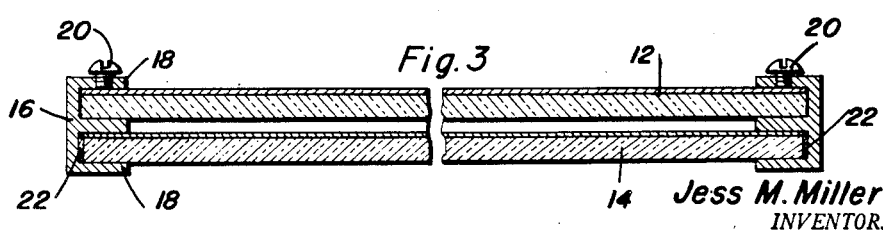
Jess M. Miller
INVENTOR.
BY *Clarence A. O'Brien*
*and Harvey B. Jacobson*
Attorneys Feb. 12, 1957   J. M. MILLER   2,780,960
MAGNIFYING MIRROR FOR MEDICINE CABINET
Filed Sept. 2, 1954   2 Sheets-Sheet 2
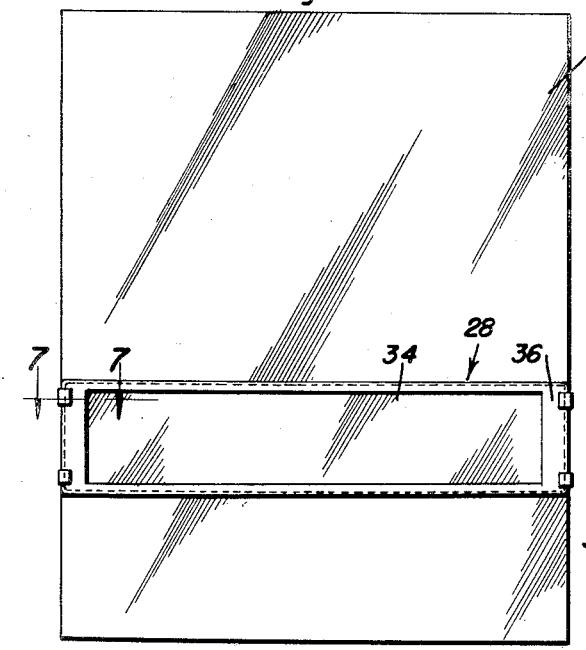
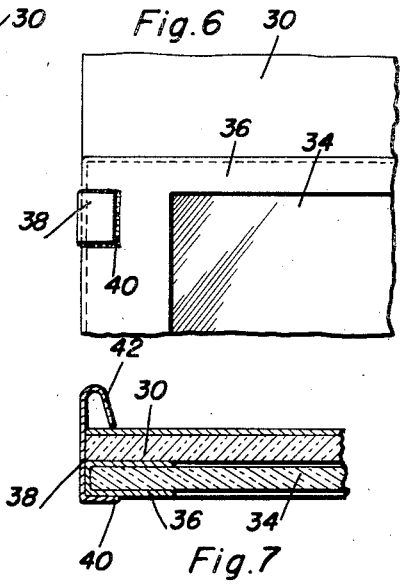
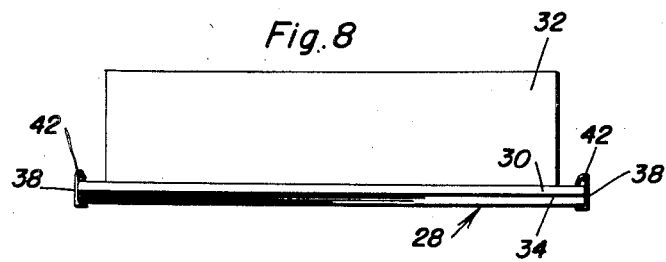
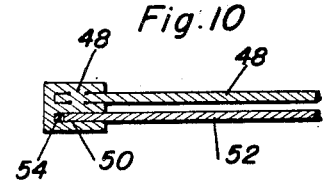
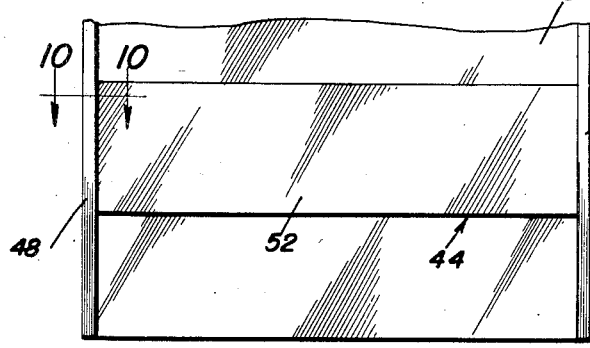
Jess M. Miller
INVENTOR.
BY
Attorneys

United States Patent Office 2,780,960
Patented Feb. 12, 1957

2,780,960

MAGNIFYING MIRROR FOR MEDICINE CABINET

Jess M. Miller, Lakeland, Fla.

Application September 2, 1954, Serial No. 453,789

2 Claims. (Cl. 88—100)

This invention relates to a magnifying mirror for medicine cabinets or the like, and more specifically provides an auxiliary attachment for vertical sliding movement on medicine cabinet mirrors wherein the magnifying mirror will cover a portion of the medicine cabinet mirror thereby forming a partial magnified mirror.

An object of this invention is to provide a magnifying mirror or other magnifying means for a medicine cabinet wherein a portion of the medicine cabinet mirror will be provided with magnifying means thereby enlarging the image shown thereby.

Another object of the present invention is to provide a magnifying device for attachment to medicine cabinet mirrors wherein either a magnifying mirror of suitable construction or a magnifying glass may be vertically mounted on the medicine cabinet mirror thereby enlarging the image shown in the mirror wherein a portion of the reflected image will be enlarged.

Yet another object of the present invention is to provide a magnifying device for medicine cabinets that is simple in construction, easy to use, adaptable for various installations, well adapted for its intended purposes, and relatively inexpensive to manufacture and maintain.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view showing a magnifying mirror slidably in position on the forward face of a medicine cabinet mirror;

Figure 2 is a top plan sectional view taken substantially upon a plane passing along section line 2—2 of Figure 1 showing the details of construction of the guide way for slidably adjusting the magnifying mirror and the friction means for retaining the magnifying mirror in adjusted position;

Figure 3 is a top plan sectional view taken substantially upon a plane passing along section line 3—3 of Figure 1 showing the spaced relationship of the magnifying mirror and the structural details thereof;

Figure 4 is a detailed sectional view showing an enlarged cross view of the magnifying mirror with the spring friction means in position between the end of the mirror and the guide rail;

Figure 5 is a front elevational view showing a modified form of reflectifying mirror wherein the magnifying mirror is adapted for attachment to mirrors that are not provided with channel shaped vertical guides;

Figure 6 is an enlarged detailed view showing the manner in which the magnifying mirror frame and the attaching clip are secured together;

Figure 7 is a top plan detailed sectional view taken substantially upon a plane passing along section line 7—7 of Figure 5 showing the details of construction of this form of the magnifying mirror;

Figure 8 is a top plan view showing a medicine cabinet of the present invention utilizing the construction of Figure 5;

Figure 9 is a front elevational view showing a stainless steel type magnifying mirror slidably adjustably mounted adjacent the forward face of a stainless steel cabinet mirror; and Figure 10 is a top plan sectional view taken substantially upon a plane passing along section line 10—10 of Figure 9 showing the details of construction of the slidable stainless steel magnifying mirror.

Referring now specifically to the drawings, it will be seen that the numeral 10 generally designates a magnifying mirror for attachment to a conventional medicine cabinet mirror 12 wherein the magnifying mirror 10 generally includes a horizontally elongated rectangular magnifying mirror 14 vertically slidably mounted on the top surface of the cabinet mirror 12. The cabinet mirror 12 is provided with a double channel shaped side edging 16 that is substantially formed in the shape of the letter E. Each of the edging strips 16 is provided with three spaced inwardly extending members 18 wherein the cabinet mirror 12 is disposed between the rearmost and the central of the members 18 and held therein by screw members 20. The magnifying mirror 14 is disposed between the forwardmost and the central of the members 18 and is frictionally held in adjustable position therein by a pair of substantially U-shaped spring members 22 that have an outwardly bowed central portion 24 for engaging the inner surface of the edging member 16. The outer ends of the spring member 22 which form the legs of the U-shaped spring member 22 overlap and engage the upper and lower edges of the magnifying mirror 14 thereby supporting the mirror 14 in frictionally adjusted vertical position on the face of the cabinet mirror 12. It will be understood that each of the mirrors 12 and 14 are provided with suitable backing 26 and the mirrors 12 and 14 may be constructed of suitable materials meeting the general requirements of the home building industry.

Referring now specifically to Figures 5–8, a modified form of the magnifying mirror is generally designated by the numeral 28. The magnifying mirror 28 is attached to a mirror 30 mounted on the forward face of a medicine cabinet 32 wherein the side edges of the mirror 30 project beyond the side edges of the cabinet 32 and no side edging strip is provided on the mirror 30. The magnifying mirror 28 includes an elongated mirror member 34 of a suitable magnifying type having a peripheral frame 36 extending therearound. At each corner on the side edges of the frame 36 is provided a spring clip 38 that is welded or otherwise secured to the spring 36 as indicated by the numeral 40 on the forward face thereof. The rear end of the spring clip 38 is provided with a reversely bent portion 42 that resiliently engages the rear surface of the mirror 30 thereby securing the magnifying mirror 28 detachably to the mirror 30 in vertically adjusted position. By merely engaging the reversely bent portion 42 of the spring clip 38, the magnifying mirror 28 may be positioned on the mirror 30 and removed from the mirror 30, or vertically adjusted thereon as desired thereby providing an area of magnification on the cabinet mirror 30.

Referring now specifically to Figures 9 and 10, it will be seen that the numeral 44 generally indicates a stainless steel magnifying mirror for attachment to a stainless steel medicine cabinet mirror 46 wherein the stainless steel medicine cabinet mirror 46 is provided with an edging strip 48 that is bonded to the longitudinal side edges of the stainless steel mirror by any suitable means. The forward end of the edging strip 48 is provided with a channel shaped opening 50 for receiving the end of a stainless steel magnifying mirror 52 wherein a resilient spring 54 having an outwardly bowed central portion is disposed between the ends of the mirror 52 and the bottom of the channel shaped member 50 thereby providing a frictional blocking means for retaining the mirror 52 in vertically adjusted position on the forward face of the mirror 46. This construction is substantially similar to that shown in Figures 1–4 but is employed on a stainless steel type of mirror normally used in certain installations.

The device of Figures 1–4 is especially adapted and more applicable to the manufacture of new medicine cabinets wherein the medicine cabinet will be provided with the magnifying mirror 10 already installed thereon. However, it will be understood that the magnifying mirror may be attached to existing mirrors and the device as illustrated in the Figures 5–8 is especially useful in attachment to existing medicine cabinets that have already been installed. The device as illustrated in Figures 9 and 10 is especially adapted for use in conjunction with a mirror constructed of stainless steel rather than glass.

Also, it will be understood that these devices may be attached to medicine cabinets having sliding mirror doors and while the device is illustrated as being a magnifying mirror, it will be understood that a magnifying glass as well as a magnifying mirror may be utilized for providing a magnifying means for the usual medicine cabinet mirror wherein a portion of the image reflected by the medicine cabinet mirror will be enlarged for the purposes desired.

While the magnifying means of the present invention is illustrated and described for use with a medicine cabinet, it will be understood that the device may be utilized on any mirror where magnification of the image is desirable, such as in rest rooms and on mirrors in public or semi-public places in the nature of hotels, railway passenger vehicles, airplanes, or the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a cabinet having a vertically elongated front mirror having sides, a horizontally elongated magnifying mirror having ends, a pair of strips at the sides of the front mirror having a first pair of grooves therein in which said sides of the front mirror are fixed, said strips having a second pair of grooves therein in front of said mirror, and leaf springs supporting the ends of the magnifying mirror and having portions bowed outwardly of said ends in the plane of the magnifying mirror frictionally engaging the bottoms of the grooves of the second pair to provide for sliding adjustment of said magnifying mirror.

2. The combination of claim 1, said springs having ends overlapping and engaging top and bottom edges of the magnifying mirror.

References Cited in the file of this patent
UNITED STATES PATENTS

| | | |
|---|---|---|
| 1,007,760 | Williams | Nov. 7, 1911 |
| 1,068,888 | Glowacki | July 29, 1913 |
| 1,114,559 | Weed | Oct. 20, 1914 |
| 1,424,807 | Dieckmann | Aug. 8, 1922 |
| 1,705,587 | Roberts | Mar. 19, 1929 |
| 2,057,807 | Whitmore | Oct. 20, 1936 |

FOREIGN PATENTS

| | | |
|---|---|---|
| 171,475 | Great Britain | Nov. 10, 1921 |